US005482469A

United States Patent [19]
Seiceanu et al.

[11] Patent Number: 5,482,469
[45] Date of Patent: Jan. 9, 1996

[54] DUAL MONITOR SELF-CONTAINED SIX PORT DIGITAL SIGNAL CROSS-CONNECT MODULE

[75] Inventors: Aurel Seiceanu, Mundelein; Nicholas J. Logisz, Mount Prospect; Rueben M. Beilke, Westchester, all of Ill.

[73] Assignee: Trimm, Inc., Libertyville, Ill.

[21] Appl. No.: 89,513

[22] Filed: Jul. 21, 1993

[51] Int. Cl.$^6$ .............................. H01R 29/00; H01P 1/10
[52] U.S. Cl. .................. 439/188; 200/51.04; 200/51.09; 333/105; 439/53
[58] Field of Search .................................... 333/101, 105, 333/124, 127; 375/36; 439/188, 53, 579; 200/51 R, 51.04, 51.09, 51.1, 51.11

[56] References Cited

U.S. PATENT DOCUMENTS

| | | | |
|---|---|---|---|
| 4,749,968 | 6/1988 | Burroughs | 333/105 |
| 4,815,104 | 3/1989 | Williams et al. | 375/36 |
| 5,214,673 | 5/1993 | Morgenstein et al. | 375/36 |
| 5,233,501 | 7/1993 | Allen et al. | 439/188 |
| 5,246,378 | 9/1993 | Seiceanu | 439/188 |
| 5,348,491 | 9/1994 | Louwgie et al. | 439/188 |

OTHER PUBLICATIONS

"Connections", vol. #61, Sep. 1990,. ADC Telecommunications.

*Primary Examiner*—William M. Shoop, Jr.
*Assistant Examiner*—Jonathan S. Kaplan
*Attorney, Agent, or Firm*—Wood, Phillips, VanSanten, Clark & Mortimer

[57] ABSTRACT

The disclosed module is used in a digital telecommunication network having a digital cross-connect system. The module comprises a compact, self-contained, six jack port, dual monitor, digital signal cross-connect switching module. A plurality of modules comprise a system having provisions for cross-connect switching, rerouting, repair, patch and roll and monitoring. The interior of the module housing is specifically designed to conform with its internal assemblage so as to have the total effect of providing improved digital signal performance. The internal assemblage consists of a switching mechanism, monitoring circuits, resistors, conductors, inductors and insulators providing digital signal access through its six jack ports. Two of the jack ports are multi-purpose, having provisions for monitoring as well as digital signal access. A transmission system having this module has a digital signal range of at least 300 KHz to 100 MHz. The six jack port digital switching module paired with a like unit has an input jack port, an output jack port, a cross-connect input jack port, a cross-connect output jack port and four multi-purpose monitor jack ports. Each uses a make before break switch providing, without any loss of signal, the means for bridging, disengaging, isolating, connecting respective conductors, and terminating a first input signal through a 75 ohm resistor to ground when a plug is inserted into a second output jack port, and terminating a first output signal through a 75 ohm resistor to ground when a plug is inserted into a second input jack port.

19 Claims, 3 Drawing Sheets

5,482,469

DUAL MONITOR SELF-CONTAINED SIX PORT DIGITAL SIGNAL CROSS-CONNECT MODULE

FIELD OF THE INVENTION

This invention relates to a self-contained digital signal cross-connect module and, more particularly, to a dual monitor module having an improved monitor network.

BACKGROUND OF THE INVENTION

A cross-connect system within a telecommunications digital network facilitates the installation, rerouting, testing, monitoring, restoration, and repair of digital telecommunications apparatus. Such a system includes a plurality of digital cross-connect modules. A typical module includes a housing which provides an RF-EMI shield for its internal components preventing RF signal energy from entering and interfering with digital signals in adjacent modules. The module includes a pair of input jack ports electrically connected to one another and a pair of output jack ports electrically connected to one another. Each of the jack ports is adapted to receive a plug terminating a coaxial cable. A switching circuit in the housing normally electrically connects one of the input jack ports to one of the output jack ports in the absence of an electrical plug being received in each of the other input jack port and the other output jack port. The housing also contains a monitor jack port electrically connected to the one output jack port to permit monitoring of the output signal.

Such a module is conventionally used in a panel system with plural additional modules. The cross-connection feature of the switch provides suitable electric connections to coaxial cables connected to the one input jack port and the one output jack port. Alternative connections are provided by securing patch cords or looping plugs into the other of the input jack port or the output jack port, as is well known.

One known type of cross-connect module is shown in U.S. Pat. No. 4,815,104. Each module houses separate enclosed units consisting of a separate enclosure for each of its input monitor jack ports, an output monitor jack port, an input switching jack port assembly, and an output switching jack port assembly, each on the front panel of the housing. A coaxial cable extends from each of the monitoring jack ports and is connected to its respective input switching jack port assembly or the output switching jack port assembly. The module further contains two coaxial cables extending from the two switching jack ports and terminating in coaxial connector jack ports which are attached to the rear of the housing. Such a modular design provides satisfactory services for digital cross-connect systems. There exists, however, limitations with respect to digital signal transmission performance. The design purpose of each of the two monitor jack ports is restricted to monitoring the transmission of signal. Access to digital signals for patching, interconnecting and cross-connecting is achieved through other jack ports. Operating efficiency in terms of return loss over a wide frequency range is less than satisfactory. Such a module is an assemblage of discrete assembled units and interconnecting cabling within the confines of a housing requiring use of more space.

The present invention is directed to overcoming one or more of the problems discussed above in a novel and simple manner.

SUMMARY OF THE INVENTION

Broadly, there is disclosed herein a cross-connect, dual monitor switching module adapted for monitoring, testing, maintenance, installation and the like of electrical signal transmission systems. The module comprises a housing. A first input jack port and a first output jack port are mounted in the housing, each being adapted to receive an electrical plug. A second input jack port and a second output jack port are mounted in the housing, each being adapted to receive an electrical plug. Circuit means electrically connect the first input jack port to the second input jack port and the first output jack port to the second output jack port. Switch means normally electrically connect the first input jack port to the first output jack port in the absence of an electrically plug being received in either the second input jack port or the second output jack port and for electrically isolating the first input jack port from the first output jack port in response to a plug being received in either the second input jack port or the second output jack port. A first monitor jack port and a second monitor jack port are mounted in the housing, each being adapted to receive an electrical plug. An attenuating network electrically connects the first and second monitor jack ports in parallel to the first output jack port.

It is a feature of the invention that the first input jack port, the first output jack port and the first monitor jack port are each mounted at one end of the housing and the second input jack port, second output jack port and second monitor jack port are each mounted at an opposite end of the housing.

It is another feature of the invention that the circuit means comprises a first inductor connected between the first input jack port and the second input jack port and a second inductor connected between the first output jack port and the second output jack port.

It is a further feature of the invention that the network is electrically connected between the first output jack port and the second inductor.

It is another feature of the invention that the network comprises a resistor in series with each of the first and second monitor jack port.

It is a further feature of the invention that the network comprises an inductor.

There is disclosed in accordance with another aspect of the invention a cross-connect, monitor switching module adapted for monitoring, testing, maintenance, installation and the like of electrical signal transmission systems.

Broadly, there is disclosed herein a cross-connect, dual monitor switching module adapted for monitoring, testing, maintenance, installation and the like of electrical signal transmission systems. The module comprises a housing. A first input jack port and a first output jack port are mounted in the housing, each being adapted to receive an electrical plug. A second input jack port and a second output jack port are mounted in the housing, each being adapted to receive an electrical plug. Circuit means electrically connect the first input jack port to the second input jack port and the first output jack port to the second output jack port. Switch means normally electrically connect the first input jack port to the first output jack port in the absence of an electrically plug being received in either the second input jack port or the second output jack port and for electrically isolating the first input jack port from the first output jack port in response to a plug being received in either the second input jack port or the second output jack port. A monitor jack port is mounted in the housing and is adapted to receive an electrical plug. An attenuating network electrically connects the monitor jack port to the first output jack port, the network comprising a network inductor and a resistor connected in series between the first output jack port and the monitor jack port.

It is a feature of the invention that the network inductor comprises a wound toroid.

It is another feature of the invention that the network inductor comprises a pair of cascaded wound toroids.

It is a further feature of the invention that the wound toroid comprises a toroid core with inductance factor $A_L$ of 2040 millihenries (mH) per 1000 turns or initial permeability $\mu_0$ of 5000.

It is a further feature of the invention that the wound toroid comprises a toroidal core having a conductor wound eleven times thereon.

It is an additional feature of the invention that each wound toroid comprises a toroidal core having a pair of conductors wound eleven times thereon.

It is still another feature of the invention that each wound toroid comprises a toroidal core having a pair of conductors wound eleven times thereon, the pair of conductors being twisted three turns per inch of length.

It is still another feature of the invention to provide a second monitor jack port connected in series with a further resistor to the network inductor.

More specifically, this invention relates to a digital telecommunication network having a digital cross-connect system. A compact, self-contained, six jack port, dual monitor, digital signal cross-connect switching module is used. A plurality of modules comprise a system having provisions for cross-connect switching, rerouting, repair, patch and roll and monitoring. The interior of the module housing is specifically designed to conform with its internal assemblage so as to have the total effect of providing improved digital signal performance. The internal assemblage consists of a switching mechanism, monitoring circuits, resistors, conductors, inductors and insulators providing digital signal access through its six jack ports. Two of the jack ports are multi-purpose, having provisions for monitoring as well as digital signal access. A transmission system having this module has a digital signal range of at least 300 KHz to 100 MHz. The six jack port digital switching module paired with a like unit has an input jack port, an output jack port, a cross-connect input jack port, a cross-connect output jack port and four multi-purpose monitor jack ports. Each uses a make before break switch providing, without any loss of signal, the means for bridging, disengaging, isolating, connecting respective conductors, terminating an input signal through a 75 ohm resistor to ground when a plug is inserted into a second output jack port, and terminating an output signal through a 75 ohm resistor to ground when a plug is inserted into a second input jack port.

Further features and advantages of the invention will be readily apparent from the specification and from the drawing.

DETAILED DESCRIPTION OF THE INVENTION

Figure 1:
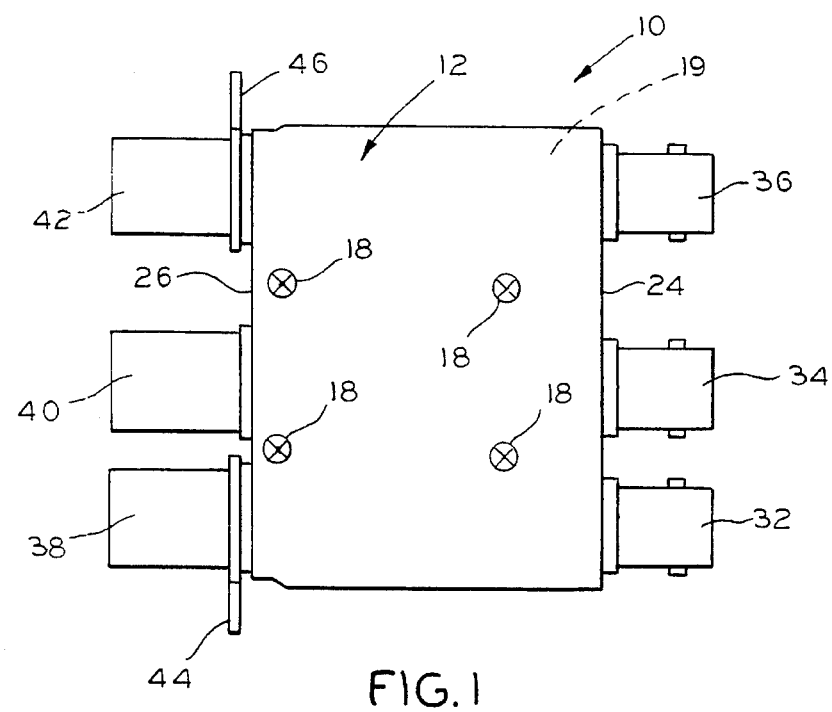
FIG. 1 is plan view of a cross-connect, monitor switching module according to the invention.

Referring initially to FIG. 1, there is illustrated a compact, self-contained six jack port digital signal switching module 10 according to the invention. The module 10 is adapted for use in a digital telecommunication network having a digital cross-connect system. A plurality of such modules 10 comprise a system having provisions for cross-connect switching, rerouting, repair, patch and roll and monitoring.

Figures 2, 2A, 2B:
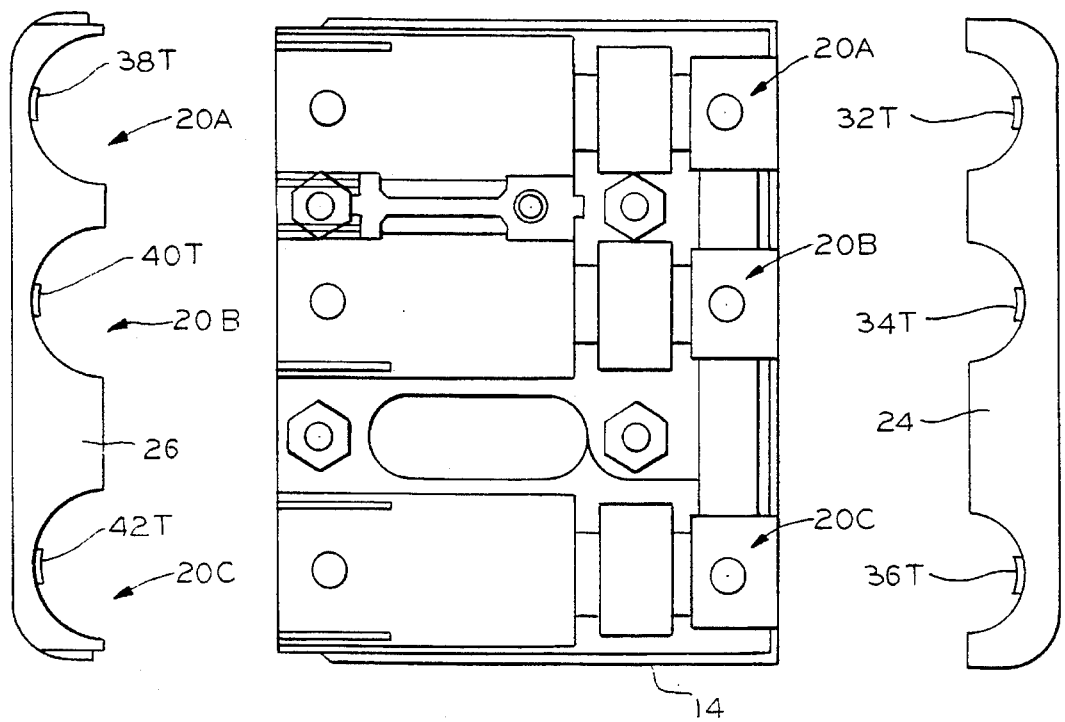
FIGS. 2, 2A and 2B comprise an inside plan view and opposite end views, respectively, for an enclosure top for the module of FIG. 1.
Figures 3, 3A, 3B:
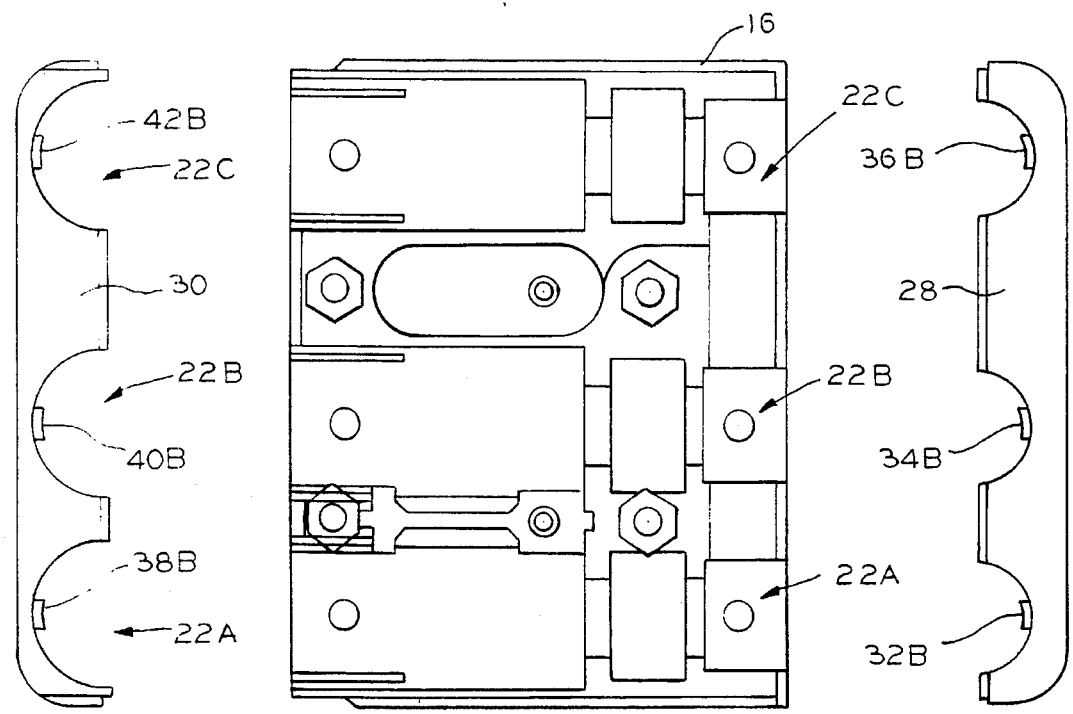
FIGS. 3, 3A and 3B comprise an inside plan view and opposite end views, respectively, for an enclosure bottom for the module of FIG. 1.

The module 10 includes a two-pie housing 12. The housing 12 includes an enclosure top 14, see FIG. 2, and an enclosure bottom 16, see FIG. 3. The top 14 and bottom 16 are each of die cast metal construction. The top 14 and bottom 16 mate using a tongue and groove configuration and are held together by a plurality of fasteners 18, see FIG. 1. This fitting relationship provides a shield preventing RF energy from being emitted from the module 10.

The top 14 and bottom 16 define an interior space 19. The geometry of the interior space 19 corresponds to the size, form and arrangement of the module's internal components, discussed below, for attaining optimum performance and digital signal transmission. Particularly, the top 14 is cast to include three parallel, generally semi-cylindrical cavities 20A, 20B and 20C. The bottom 16 includes corresponding parallel, generally semi-cylindrical cavities 22A, 22B and 22C. When mated, the cavity 20A is positioned above the cavity 22A. Similarly, the cavity 20B is positioned above the cavity 22B and the cavity 20C is positioned above the cavity 22C. With the top 14 and bottom 16 assembled together generally cylindrical cavities 23A, 23B and 23C result, as is apparent. The separate cylindrical cavities 23A, 23B, and 23C provide separate enclosed units for input ports, output ports and monitor ports, as well as switching assemblies, as discussed below. The particular cylindrical configuration of each cavity is designed to accept the components installed therein, as described below.

In the illustrated embodiment of the invention, each of the top 14 and bottom 16 are 1.625 inches long and 2.1 inches wide. The center line spacing between the cavities 20A and 20B and the cavities 22A and 22B is 0.625 inches. The spacing between the cavities 20B and 20C and the cavities 22B and 22C is 0.875 inches. The top 14 includes a rear wall 24 and a front wall 26. The bottom 16 includes a rear wall 28 and a front wall 30.

The housing 12 houses a first input jack port 32, a first output jack port 34 and a first monitor jack port 36, in the respective cavities 23A, 23B and 23C, proximate the top rear wall 24 and the bottom rear wall 28. Each of the jack ports 32, 34 and 36 comprises a conventional female BNC connector. Particularly, each jack port 32, 34 and 36 is adapted to be connected to a conventional male BNC connector which is connected to a coaxial cable used in a telecommunication network system. Each of the jack ports 32, 34 and 36 is maintained in position by an associated stud 32T, 34T and 36T, respectively, in the top 14 and 32B, 34B and 36B in the bottom 16.

The housing 12 also houses a second input jack port 38, a second output jack port 40 and a second monitor jack port 42, in the respective cavities 23A, 23B and 23C, proximate the top front wall 26 and bottom front wall 30. Each of the jack ports 38, 40 and 42 comprises a female WECO type connector. The jack ports 38, 40 and 42 are maintained in proper position and alignment by studs 38T, 40T and 42T in the top 14 and studs 38B, 40B and 42B in the bottom 16. The second input jack port 38 and the second monitor jack port 42 each include a respective flange 44 and 46 having an opening (not shown) for securing the module 10 in a panel.

Figure 4:
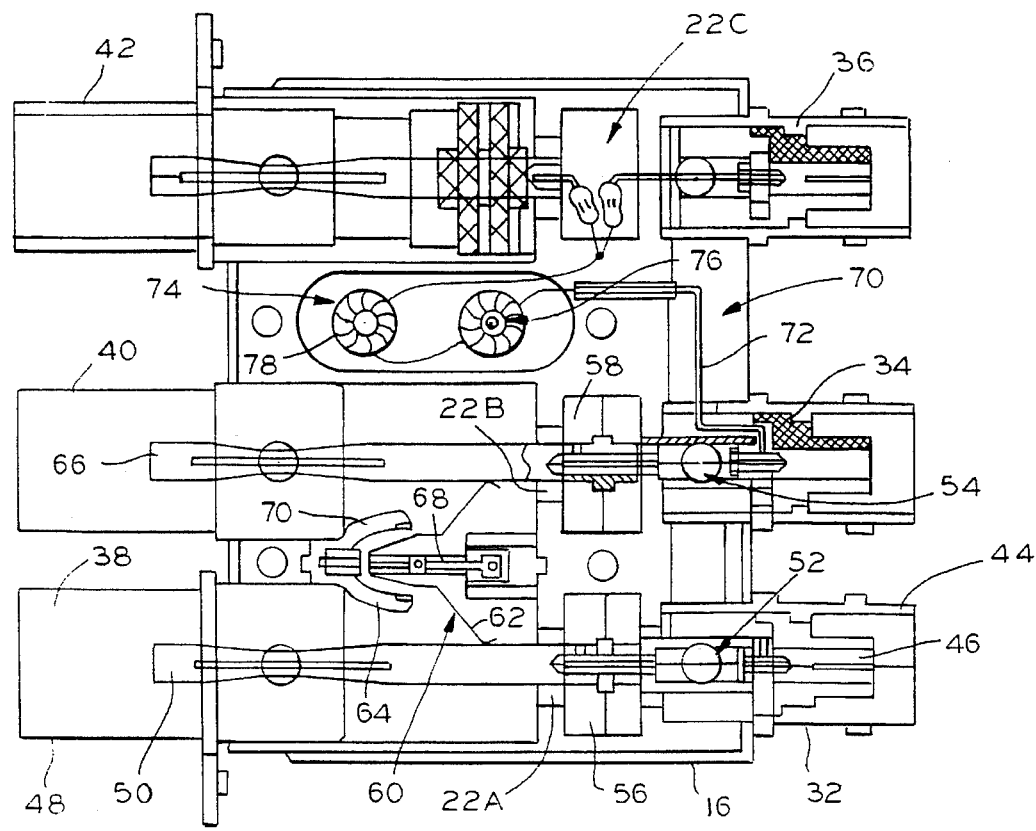
FIG. 4 is a top plan view of the module of FIG. 1 with the enclosure top removed.
Figure 5:
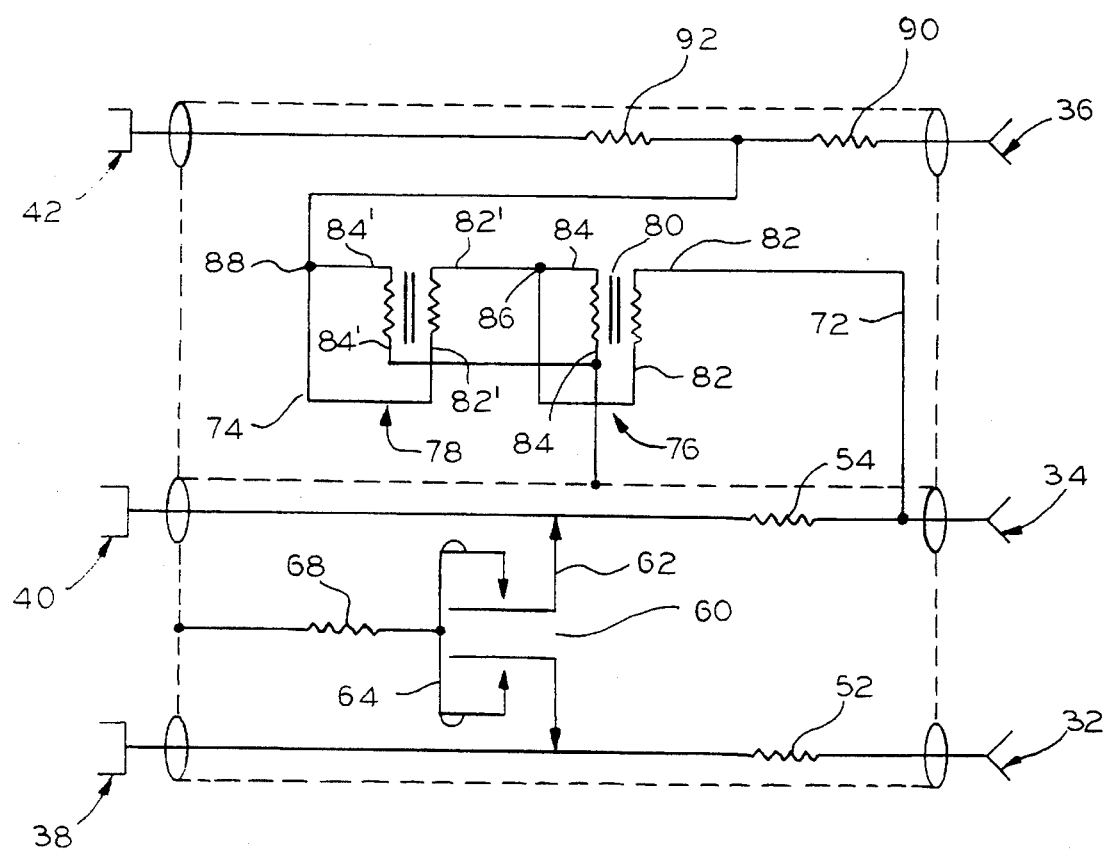
FIG. 5 is an electrical schematic for the module of FIG. 1.

With reference to FIG. 4, the first input jack port 32 is diametrically, axially aligned with the second input jack port 38 in the first bottom cavity 22A. The first output jack port 34 and the second output jack port 40 are diametrically, axially aligned in the second bottom cavity 22B. The first monitor jack port 36 and second monitor jack port 42 are diametrically, axially aligned in the third bottom cavity 22C.

Each of the BNC type jack ports 32, 34 and 36 have identical mating features. For simplicity herein, only the first input jack port 32 is described in detail. The first input jack port 32 includes a conductive outer sleeve 44 insulated from a female connector 46. The conductive outer sleeve 44 is mounted to the housing 12 so that it is contact with both the top 14 and the bottom 16 so that the housing 12 serves as a ground or reference.

Each of the WECO type jack ports 38, 40 and 42 have identical mating features. For simplicity, only the second input jack port 38 is described in detail. The second input jack port 38 includes a conductive outer sleeve 48 insulated from a central female connector element 50. As with the BNC type jack ports, the outer sleeve 48 is in contact with the top 14 and bottom 16 so that it is electrically grounded.

The first input jack port female connector 46 is electrically connected to the first output jack port female connector 50 using a first inductor 52. Similarly, the first output jack port 34 is connected to the second output jack port 40 using a second inductor 54. Insulation spacers 56 are used for maintaining proper alignment between the first inductor 52 and the second output jack port 38. An additional set of spacers 58 is used for maintaining proper positioning between the second inductor 54 and the second output jack port 40.

A switch 60 is physically positioned in the bottom 16 between the first and second cavities 22A and 22B. The switch 60 includes a first blade 62 and a second blade 64. The first blade 62 is normally in electrically contact with the second input jack port female connector 50 and a corresponding female connector 66 of the second output jack port 40. The second blade 64 surrounds the first blade 62 and is electrically connected via a resistor 68 to ground. A contact pad 69 surrounds the second switch blade 64.

The switch 60 is a conventional early make before break switch contact. The switch 60 provides electrical connection between the first input jack port 32 and the first output jack port 34, via the inductors 52 and 54, in the absence of an electrical plug being received in either the second input jack port 38 or the second output jack port 40. When a male type WECO connector plug is inserted in either the second input jack port 38 or the second output jack port 40, the plug causes the pad 69 to depress, resulting in the second switch plate 64 contacting the first switch plate 62 so that the connection is terminated through a resistance to ground before the cross-connect between the first input jack port 32 and the first output jack port 34 is broken. As the particular plug is inserted further, the first switch plate 62 is positioned away from the particular connector element 50 or 66, according to which jack port 38 or 40 is being used, to isolate the first input jack port 32 from the first output jack port 34.

An attenuating network 70 electrically connects the first and second monitor jack ports 36 and 42 to the first output jack port 34. The attenuating network 70 includes a conductor 72 connected to the junction between the first output jack port 34 and the second inductor 54 and terminating at a network inductor 74. The network inductor 74 comprises a pair of cascaded wound toroids 76 and 78. Each of the toroids 76 and 78 is identical in construction. For simplicity, only one is described in detail. The first wound toroid 76 comprises a toroid core 80 with an inductance factor $A_L$ of 2040 millihenries (mH) per 1000 turns or initial permeability $\mu_0$ of 5000. A pair of conductors 82 and 84 are wound on the core 80. The conductors 82 and 84 comprise 34 gauge wire. The two conductors 82 and 84 are twisted three twists per inch. The twisted conductors 82 and 84 are wound to provide eleven turns about the core 80 in a clockwise direction from approximately a one o'clock position as illustrated to an eleven o'clock position as illustrated. Both wound toroids 76 and 78 are wound in the same way and are identically positioned in space, as illustrated. With the first wound toroid 76, a first end of the conductor 82 is connected to the input conductor 72. A second end of the conductor 82 is connected to a first end of the conductor 84 at a junction 86. The second end of the conductor 84 is connected to ground. With the second wound toroid 78, a first end of its conductor 82' is connected to the junction 86. The second end of the conductor 82' is connected to the first end of the connector 84' at a junction 88 and the second end of the conductor 84' is connected to ground. The junction 88 is connected to first and second monitor resistors 90 and 92. The first monitor resistor 90 is connected in series with the connector of the first monitor jack port 36. The second monitor resistor 92 is connected in series with the connector of the second monitor jack port 42. Thus, the first and second monitor jack ports 36 and 42 are connected in parallel, along with their associated respective resistors 90 and 92, to the network inductors 74 and thus the first output jack port 34.

In the illustrated embodiment of the invention, the first inductor 52 is a 0.022 µH or similar inductor. The second inductor 54 is a 0.056 µH or similar inductor. The terminating resistor 68 is a 75 ohm resistor. The monitor resistors 90 and 92 are 110 ohm or similar to provide −21 dB monitoring level.

The module 10 as described provides a monitor level within −21 dB±1.5 dB. The return loss is greater than −28 dB at 22.368 MHz. The insertion loss is 0.60 dB±0.5 dB (from in to out). The frequency range is 300 KHz to 100 MHz, the range being variable by selecting particular components. The characteristic impedance with both monitors terminated into respective 75 ohm resistors tested at 75 ohms is within ±8% at 22.368 MHz. The monitoring level is affected less than 0.5 dB when a second monitor jack port is accessed.

In a conventional installation the first input jack port 32 and first output 34 are suitably connected to a network. The first monitor jack port 36 may be used for patch and roll. These jack ports 32, 34 and 36 would normally be mounted to the rear of a panel not generally accessible. The jack ports 38, 40 and 42 would be front panel accessible for maintenance, testing and the like. The use of dual monitor jack ports permits one monitor jack port, such as the jack port 36, to be used for patch and roll, while the second monitor jack port 42 is used temporarily to access the signal. The attenuating network 70 provides a broad frequency spectrum for enhancing transmission of signals to the monitor jack ports 36 and 42. This allows the monitor jack ports 36 and 42 to have a true reading of the signal at the first output jack port 34 without interference or wave distortion. This allows signals to be both pulled out of either monitor jack port 36 or 42, as well as to listen in on one of the monitor jack ports 36 and 42. The use of the two wound toroids 76 and 78 with two windings buffers the signals from wave distortions.

Thus, the invention broadly comprehends a dual monitor cross-connect switching module having an improved attenuating network for improving transmission of monitor signals.

We claim:

1. A cross-connect, dual monitor switching module adapted for monitoring, testing, maintenance, and installation of electrical signal transmission systems, the module comprising:

a housing;

a first input jack port and a first output jack port mounted in said housing, each being adapted to receive an electrical plug;

a second input jack port and a second output jack port mounted in said housing, each being adapted to receive an electrical plug;

circuit means for electrically connecting said first input jack port to said second input jack port and said first output jack port to said second output jack port;

switch means for electrically connecting said first input jack port to said first output jack port in the absence of an electrical plug being received in either said second input jack port or said second output jack port and for electrically isolating said first input jack port from said first output jack port in response to a plug being received in either said second input jack port or said second output jack port;

a first monitor jack port and a second monitor jack port mounted in said housing, each being adapted to receive an electrical plug; and an electrical network electrically connecting said first and second monitor jack ports in parallel to said first output jack port.

2. The module of claim 1 wherein said first input jack port, said first output jack port and said first monitor jack port are each mounted at one end of said housing and said second input jack port, said second output jack port and said second monitor jack port are each mounted at an opposite end of said housing.

3. The module of claim 1 wherein said circuit means comprises a first inductor connected between said first input jack port and said second input jack port and a second inductor connected between said first output jack port an said second output jack port.

4. The module of claim 3 wherein said network is electrically connected between said first output jack port and said second inductor.

5. The module of claim 1 wherein said network comprises a resistor in series with each said first and second monitor jack port.

6. The module of claim 1 wherein said network comprises an inductor.

7. A cross-connect, monitor switching module adapted for monitoring, testing, maintenance, and installation of electrical signal transmission systems, the module comprising:

a housing;

a first input jack port and a first output jack port mounted in said housing, each being adapted to receive an electrical plug;

a second input jack port and a second output jack port mounted in said housing, each being adapted to receive an electrical plug;

circuit means for electrically connecting said first input jack port to said second input jack port and said first output jack port to said second output jack port;

switch means for electrically connecting said first input jack port to said first output jack port in the absence of an electrical plug being received in either said second input jack port or said second output jack port and for electrically isolating said first input jack port from said first output jack port in response to a plug being received in either said second input jack port or said second output jack port;

a monitor jack port mounted in said housing, and being adapted to receive an electrical plug; and an attenuating network electrically connecting said monitor jack port to said first output jack port, said network comprising a network inductor and a resistor connected in series between said first output jack port and said monitor jack port, said network inductor comprising a wound toroid.

8. The module of claim 7 wherein said network inductor comprises a pair of cascaded wound toroids.

9. The module of claim 8 wherein each said wound toroid comprises a toroid core with an inductance factor $A_L$ of 2040 millihenries (mH) per 1000 turns or initial permeability $\mu_0$ of 5000.

10. The module of claim 8 wherein each said wound toroid comprises a toroidal core having a conductor wound eleven times thereon.

11. The module of claim 8 wherein each said wound toroid comprises a toroidal core having a pair of conductors wound eleven times thereon.

12. The module of claim 8 wherein each said wound toroid comprises a toroidal core having a pair of conductors wound eleven times thereon, the pair of conductors being twisted three turns per inch of length.

13. The module of claim 7 wherein said circuit means comprises a first inductor connected between said first input jack port and said second input jack port and a second inductor connected between said first output jack port to said second output jack port.

14. The module of claim 13 wherein said network inductor is electrically connected between said first output jack port and said second inductor.

15. A cross-connect, monitor switching module adapted for monitoring, testing, maintenance, and installation of electrical signal transmission systems, the module comprising:

a housing;

a first input jack port and a first output jack port mounted in said housing, each being adapted to receive an electrical plug;

a second input jack port and a second output jack port mounted in said housing, each being adapted to receive an electrical plug;

circuit means for electrically connecting said first input jack port to said second input jack port and said first output jack port to said second output jack port;

switch means for electrically connecting said first input jack port to said first output jack port in the absence of an electrical plug being received in either said second input jack port or said second output jack port and for electrically isolating said first input jack port from said first output jack port in response to a plug being received in either said second input jack port or said second output jack port;

a monitor jack port mounted in said housing, and being adapted to receive an electrical plug; and an attenuating network electrically connecting said monitor jack port to said first output jack port, said network comprising a network inductor and a resistor connected in series between said first output jack port and said monitor jack port, the module further comprising a second monitor jack port connected in series with a further resistor to said network inductor.

16. A cross-connect dual monitor switching module adapted for monitoring, testing, maintenance, and installation of electrical signal transmission systems, the module comprising:

a housing including opposite front and rear walls and having separate first, second and third cavities extending therebetween;

a first input jack port and a first output jack port diametrically aligned in said housing first cavity, each being electrically connected to the other and adapted to receive an electrical plug;

a second input jack port and a second output jack port diametrically aligned in said housing second cavity, each being electrically connected to the other and adapted to receive an electrical plug;

switch means for electrically connecting said first input jack port to said first output jack portion in the absence of an electrical plug being received in either said second input jack port or said second output jack port and for electrically isolating said first input jack port from said first output jack port in response to a plug being received in either said second input jack port or said second output jack port;

a first monitor jack port and a second monitor jack port diametrically aligned in said housing third cavity, each being adapted to receive an electrical plug; and an electrical network electrically connecting said first and second monitor jack ports in parallel to said first output jack port.

17. The module of claim 16 wherein said housing comprises a two-piece metal housing providing a shield preventing RF energy from being emitted from the module.

18. The module of claim 16 wherein said first, second and third cavities are parallel to one another in said housing.

19. The module of claim 16 wherein said first input jack port, said first output jack port and said first monitor jack port are proximate the rear wall and said second input jack port, said second output jack port and said second monitor jack port are proximate the front wall.

* * * * *